US011489824B2

(12) United States Patent
Robbins et al.

(10) Patent No.: US 11,489,824 B2
(45) Date of Patent: Nov. 1, 2022

(54) AUTOMATED KEY MANAGEMENT FOR REMOTE DEVICES USING SINGLE SIGN-ON TECHNIQUES

(71) Applicant: EMC IP Holding Company LLC, Hopkinton, MA (US)

(72) Inventors: Alex John Robbins, Mansfield, MA (US); Seth Jacob Rothschild, Cambridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/886,907

(22) Filed: May 29, 2020

(65) Prior Publication Data
US 2021/0377253 A1 Dec. 2, 2021

(51) Int. Cl.
*H04L 9/40* (2022.01)
*H04L 9/30* (2006.01)
*H04L 41/0803* (2022.01)
*H04L 9/08* (2006.01)

(52) U.S. Cl.
CPC ........ *H04L 63/0815* (2013.01); *H04L 9/0891* (2013.01); *H04L 9/0894* (2013.01); *H04L 9/30* (2013.01); *H04L 41/0803* (2013.01); *H04L 63/101* (2013.01)

(58) Field of Classification Search
CPC ....... H04L 9/08; H04L 9/0891; H04L 9/0894; H04L 9/30; H04L 63/08; H04L 63/0815; H04L 63/10; H04L 63/101; H04L 41/0803
See application file for complete search history.

(56) References Cited

U.S. PATENT DOCUMENTS

| 8,649,519 | B2 * | 2/2014 | Taraci | G06F 21/10 380/258 |
| 2007/0234054 | A1 * | 10/2007 | Robert | H04L 63/0823 713/170 |
| 2010/0306286 | A1 * | 12/2010 | Chiu | H04L 67/06 707/827 |
| 2014/0317409 | A1 * | 10/2014 | Bartok | H04L 63/06 713/171 |
| 2016/0134423 | A1 * | 5/2016 | Harjula | H04L 9/14 713/176 |
| 2016/0219022 | A1 * | 7/2016 | Peterson | H04L 63/0823 |
| 2018/0145955 | A1 * | 5/2018 | Nirwal | H04L 9/08 |

OTHER PUBLICATIONS https://www.ssh.com/ssh/protocol/, downloaded on May 22, 2020.

* cited by examiner

*Primary Examiner* — Shaqueal D Wade-Wright
(74) *Attorney, Agent, or Firm* — Ryan, Mason & Lewis, LLP

(57) ABSTRACT

Techniques are provided for automated key management for accessing remote devices using single sign-on techniques. One method comprises maintaining a data record identifying target user devices that a given source user device is authorized to access; and initiating storage of a public key of the given source user device in a file of at least one target user device, wherein the given source user device accesses the at least one target user device using a secure remote connection protocol based on the public key of the given source user device stored in the file of the at least one target user device. The data record may further comprise a fingerprint of a key of the at least one target user device, and the method may further comprise comparing a fingerprint of the key returned by the at least one target user device to the fingerprint of the key obtained from the data record.

20 Claims, 9 Drawing Sheets

USER-TO-TARGET DEVICE MAPPING
DATABASE 200
(PER WEB CLIENT 112)

| SOURCE USER | AUTHORIZED TARGET USER DEVICE(S) | TARGET DEVICE SSH KEY FINGERPRINT |
|---|---|---|
| USER A | DEVICE a | SSH KEY FINGERPRINT |
| | DEVICE b | SSH KEY FINGERPRINT |
| | ⋮ | ⋮ |
| | DEVICE n | SSH KEY FINGERPRINT |
| ⋮ | | |
| USER O | | ⋮ |

FIG. 2

AUTHORIZED KEYS FILE
DATABASE 300
(PER TARGET USER DEVICE 104)

| USER IDENTIFIER | PUBLIC KEY |
|---|---|
| WEB CLIENT $WC_1$ | PUBLIC KEY $WC_1$ |
| SOURCE USER DEVICE $SU_1$ | PUBLIC KEY $SU_1$ |
| ... | |
| SOURCE USER DEVICE $SU_k$ | PUBLIC KEY $SU_k$ |

FIG. 3

WEB CLIENT PROCESS 400

SOURCE USER LOGS ON USING DESKTOP CLIENT 122 OF A SOURCE USER DEVICE 102;

EXECUTE SINGLE SIGN-ON SERVICE 108 TO CREATE SESSION FOR DESKTOP CLIENT 122;

EVALUATE USER-TO-TARGET DEVICE MAPPING DATABASE 200 TO IDENTIFY ONE OR MORE TARGET USER DEVICES 104 TO DESKTOP CLIENT 122 THAT SOURCE USER IS AUTHORIZED TO ACCESS;

IN RESPONSE TO A SOURCE USER REQUEST TO ACCESS A SELECTED TARGET DEVICE:

RECEIVE PUBLIC KEY OF SOURCE USER DEVICE 102 FROM CONFIGURATION FILE OF DESKTOP CLIENT 122 FOR REDISTRIBUTION; AND

USE SECURE REMOTE CONNECTION PROTOCOL TO STORE RECEIVED PUBLIC KEY OF SOURCE USER DEVICE 102 IN AUTHORIZED KEYS FILE 132 OF SELECTED TARGET USER DEVICE 104

FIG. 4

DESKTOP CLIENT PROCESS 500

SOURCE USER LOGS ON TO WEB CLIENT 112 USING DESKTOP CLIENT 122 OF SOURCE USER DEVICE 102 TO CREATE SINGLE SIGN-ON SESSION FOR DESKTOP CLIENT 122;

GENERATE PUBLIC/PRIVATE KEY PAIR FOR SOURCE USER DEVICE 102;

SEND PUBLIC KEY OF SOURCE USER DEVICE 102 TO WEB CLIENT 112 FOR REDISTRIBUTION; AND

UPDATE REMOTE CONFIGURATION FILE OF SOURCE USER DEVICE 102 TO USE GENERATED PRIVATE KEY AS IDENTITY FILE FOR SECURE REMOTE CONNECTION PROTOCOL AND TO INCLUDE IP ADDRESSES AND USER IDENTIFIERS FOR TARGET USER DEVICES 104 THAT SOURCE USER IS AUTHORIZED TO ACCESS

FIG. 5

AUTOMATED KEY MANAGEMENT FOR REMOTE DEVICES USING SINGLE SIGN-ON TECHNIQUES

FIELD

The field relates generally to information processing, and more particularly, to the connection of devices over a network.

BACKGROUND

Manually setting up a connection from a first device to a second device (such as a server) over a network using a secure remote connection protocol can be a tedious and error prone process, particularly when such access requires generation of a public/private key pair. One example of a secure remote connection protocol is the SSH (Secure Shell) protocol. A need exists for automated techniques for connecting to a remote device over a network.

SUMMARY

In one embodiment, a method comprises maintaining a data record identifying one or more target user devices that a given source user device is authorized to access; and initiating storage of a public key of the given source user device in a file of at least one of the one or more target user devices, wherein the given source user device accesses the at least one target user device using a secure remote connection protocol based at least in part on the public key of the given source user device stored in the file of the at least one target user device.

In some embodiments, the storage of the public key of the given source user device is performed in response to: (i) a user of the given source user device requesting to access at least a given one of the one or more target user devices, and/or (ii) one or more of the target user devices being identified in the data record.

In one or more embodiments, the data record further comprises a fingerprint of at least one key of the at least one target user device, and the method further comprises comparing a fingerprint of the at least one key returned by the at least one target user device upon the given source user device accessing the at least one target user device to the fingerprint of the at least one key of the at least one target user device obtained from the data record.

In at least some embodiments, the authorization of the given source user device to access a given target user device is removed by initiating a deletion of the public key of the given source user device in the data record for the given target user device and in the file of the given target user device.

Other illustrative embodiments include, without limitation, apparatus, systems, methods and computer program products comprising processor-readable storage media.

BRIEF DESCRIPTION OF THE DRAWINGS

FIG. 2 is a sample table of the user-to-target device mapping database of FIG. 1, according to at least one embodiment of the disclosure;

FIG. 3 is a sample table of an exemplary authorized keys file of FIG. 1, according to one or more embodiments;

FIG. 4 illustrates exemplary pseudo code for a web client process, according to an embodiment of the disclosure;

FIG. 5 illustrates exemplary pseudo code for a desktop client process 500, according to some embodiments of the disclosure;

DETAILED DESCRIPTION

Figure 1:
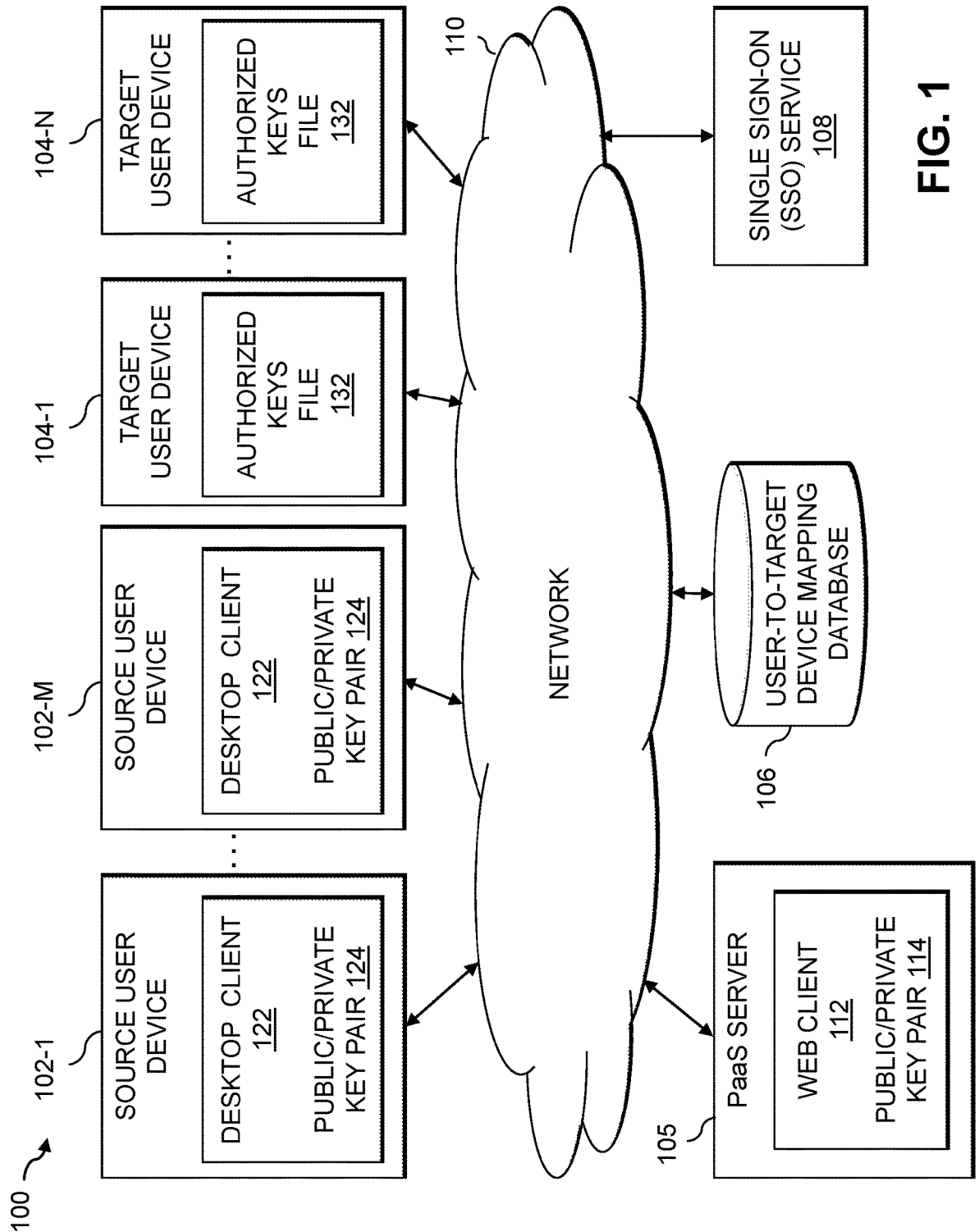
FIG. 1 shows a computer network configured for automated key management for accessing remote devices using single sign-on techniques, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for automated key management for accessing remote devices using single sign-on techniques. Single sign-on is an authentication scheme that allows users to access multiple independent systems, typically using a single user identifier and password.

In one or more embodiments that use a secure remote connection protocol, a public/private key pair is generated for a user, a configuration file is written to the user device for the secure remote connection protocol and the public key of the user is posted to one or more remote devices in order to grant access to the user. Permissions are maintained in at least some embodiments through a database that maps users to the remote devices that the respective users are authorized to access. In this manner, the device of the user can be configured to connect to any remote device that the user should be able to access, with little, if any, manual effort.

Software development and/or information technology engineers (sometimes referred to as DevOps engineers) often need to work on remote devices. Such engineers may connect to the remote devices using a secure remote connection protocol, such as the SSH-1 or SSH-2 protocols (sometimes referred to as SSH). OpenSSH is an exemplary implementation of SSH-2. SSH is a protocol by which a client can connect remotely to a host, sometimes called the server, or another remote device. Communications between the two devices in an SSH session are encrypted.

In one typical implementation, users enter their user identifier and an IP address for a desired remote device. The users are then typically asked if they recognize a hash value associated with the remote device being accessed, and the users will be prompted to enter the password for the remote device. Such SSH techniques are a powerful and popular way to connect to remote devices, as communications between the devices are encrypted.

Nonetheless, there are known security problems with the above-described standard use of SSH. For example, the passwords used for SSH connections are often the same as the superuser password of the remote device. These passwords, which are decided by users, are often short and can often be guessed by brute force over time. In addition, users rarely read the server hash key, allowing for a man-in-the-middle attack.

These problems may be mitigated by disabling password logins and managing access entirely through generated public/private key pairs. OpenSSH, for example, has built-in functionality for public key authentication where public keys stored in an authorized keys file on the remote device are used to identify and authenticate users.

In one study, a user that understands the SSH key generation process using a first operating system, for example, took over 20 minutes to set up a laptop having a second operating system to connect remotely to another device. This time cost comes from a number of factors, such as the time spent translating known commands and configurations from the first operating system to be used on devices having the second operating system and the wait time while a team member authorizes a new key on the remote device.

If a password login is disabled on a given remote device, only users who have previously been authorized or users who have physical access to the given remote device have the ability to add new authorized public keys. This is particularly problematic with virtual devices where one is dependent on, for example, the VMware vSphere console rather than physical access.

When users, such as the DevOps engineers, have more than one source device, and they wish to connect remotely to a target device from each of the source devices, the users will need to individually go through the process of key generation and adding the public key into the target device for each of the source devices from which the users intend to connect. Similarly, when connecting to more than one remote target device, the users will need to repeat this process on each of the remote target devices to which they intend to connect. When managing multiple source computers and multiple target devices, this can take nontrivial effort.

Even in the case where the user is authorized using an authorized keys file, it can be difficult to track how many of the public keys stored within that file are actually in use and who the associated users are for those keys. This can cause issues in security, where users who are not supposed to have access to a device are able to access it. It can also cause issues in management, where the authorized keys file may contain too many keys, out of date keys or multiple copies of the same key.

One or more embodiments of the disclosure provide a key management platform that abstracts configuration details of a secure remote connection protocol, such as the SSH protocol, away from the user. Users of the disclosed key management platform are often DevOps engineers who need to connect to a remote device. This problem is especially apparent for users who connect regularly to multiple different target devices, and/or users who connect remotely from multiple source devices. In addition, the disclosed key management platform may also be used by users who are not used to the development experience on their local device, often a laptop, due to, for example, an unfamiliar operating system.

One or more aspects of the disclosure recognize that within a corporate network, single sign-on is necessary and sufficient to determine which devices a given user is allowed to access. In addition, interactions with the mechanics of the secure remote connection protocol are not important to many users, who wish to connect to a remote target device in order to start working. In other words, users are often willing to cede control to configuration files in order to connect more easily.

FIG. 1 shows a computer network (also referred to herein as an information processing system) 100 configured in accordance with an illustrative embodiment. The computer network 100 comprises a plurality of source user devices 102-1 through 102-M, collectively referred to herein as source user devices 102, and a plurality of target user devices 104-1 through 104-N, collectively referred to herein as target user devices 104. The source user devices 102 and target user devices 104 are coupled to a network 110, where the network 110 in this embodiment is assumed to represent a sub-network or other related portion of the larger computer network 100. Accordingly, elements 100 and 110 are both referred to herein as examples of "networks" but the latter is assumed to be a component of the former in the context of the FIG. 1 embodiment. Also coupled to network 104 is PaaS (Platform-as-a-Service) server 105 and a single sign-on (SSO) service 108.

The source user devices 102 and/or target user devices 104 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The source user devices 102 and/or target user devices 104 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The PaaS server 105 further comprises a web client 112 and a public/private key pair 114 for the web client 112. The web client 112 can employ networking capabilities such as ethernet, Wi-Fi, etc. In asymmetric key cryptography, a user will often generate two files, known as a public key and a private key. A public key can be freely distributed. The public key can then be used to encrypt data which can only be decrypted by the owner of the private key. These pairs can also be used for public key authentication, in a known manner.

The source user devices 102 further comprise a desktop client 122 and a public/private key pair 124 for the desktop client 122. The desktop client 122 can employ networking capabilities such as ethernet, Wi-Fi, etc.

The target user devices 104 further comprise an authorized keys file 132 for storing public keys of devices that are authorized to access the respective target user device 104. The target user devices 104 can employ networking capabilities such as ethernet, Wi-Fi, etc.

The public key of the public/private key pair 114 for the web client 112 should be put in the authorized keys file 132 of each target user device 104 in the computer network 100 of the FIG. 1 system that source users should be able to connect to remotely. By doing this, the web client 112 will use its access to distribute access to other source user devices 102. In addition, the public key of the public/private key pair 124 for the desktop client 122 should be put in the authorized keys file 132 of each target user device 104 in the computer network 100 of the FIG. 1 system that the respective source user device 102 is authorized to access.

It is to be appreciated that this particular arrangement of desktop client 122 and web client 112 illustrated in source user devices 102 and PaaS server 105, respectively, of the FIG. 1 embodiment is presented by way of example only, and alternative arrangements can be used in other embodiments. For example, the functionality associated with the desktop client 122 and the web client 112 in other embodiments can be combined into a single software entity, or separated across a larger number of software entities. As another example, multiple distinct processors can be used to implement different ones of software entities 122 and 112 or portions thereof. At least portions of software entities 122 and 112 may be implemented at least in part in the form of software that is stored in memory and executed by a processor.

The network 110 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using interne protocol (IP) or other related communication protocols.

Additionally, the PaaS server 105 can access an associated database 106 configured to store a mapping of source users to target devices and SSH key fingerprints of all devices that source users should be able to access, as discussed further below in conjunction with FIG. 2.

The database 106 in the present embodiment is implemented using one or more storage systems accessible to the PaaS server 105 through the network 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the PaaS server 105 can be one or more input-output devices, which illustratively comprise keyboards, displays or other types of input-output devices in any combination. Such input-output devices can be used, for example, to support one or more user interfaces to the PaaS server 105, as well as to support communication between the PaaS server 105 and other related systems and devices not explicitly shown.

The source user devices 102, target user devices 104 and the PaaS server 105 in the FIG. 1 embodiment are assumed to be implemented using at least one processing device. Each such processing device generally comprises at least one processor and an associated memory, and implements one or more functional modules for controlling certain features of the PaaS server 105.

More particularly, source user devices 102, target user devices 104 and PaaS server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the source user devices 102, target user devices 104 and/or the PaaS server 105 to communicate over the network 110 with each other (as well as one or more other networked devices), and illustratively comprises one or more conventional transceivers.

It is to be understood that the particular set of elements shown in FIG. 1 for automated key management for remote target user devices 104 using single sign-on techniques involving source user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing web client 112 and/or desktop client 122 of an example PaaS server 105 and source user devices 102, respectively, in computer network 100 will be described in more detail with reference to FIGS. 4 through 7.

In some embodiments, the user of a source user device 102 opens the desktop client 122 and initiates a log in process, such as by clicking a "Log In" button on a user interface. The log in process executes a single sign-on route on the web client 112 on a PAAS server 105 where the web client 112 is hosted. The web client 112 is connected to a single sign-on service 108 provided for a given company. The single sign-on route verifies which user signed in and creates a session for the desktop client 122 so that the user does not need to sign in again. The concept of a session is secure and well known and is outside the scope of the present disclosure, as would be apparent to a person of ordinary skill in the art. From this point forward, both the desktop client 122 and the web client 112 agree on who the user is. If the session ends, the user will be required to log in again.

FIG. 2 is a sample table of a user-to-target device mapping database 200, according to at least one embodiment of the disclosure. In some embodiments, a separate user-to-target device mapping database 200 is maintained for each web client 112. As shown in FIG. 2, for each source user, the user-to-target device mapping database 200 comprises a list of one or more target user devices 104 (for example, by indicating the user name and IP address of each target user device 104) that the respective source user is authorized to access, as well as an SSH key fingerprint for each target user device 104.

Once the source user is validated, the desktop client 122 can query the user-to-target device mapping database 200 to determine which target user devices 104 a given user is supposed to have access to by, for example, sending an HTTP GET request to the web client 112. After receiving this data, the list of accessible target user devices 104 can be presented in the user interface of the desktop client 122.

Once the source user is logged in, the desktop client 122 can run operating system software (for example, SSH keygen) to initiate a generation of the public/private key pair 124. The resulting public/private key pair 124 is local to the source user device 102 where the desktop client 122 is running and can be stored, for example, in a remote connection configuration file on the source user device 102.

The generated private key can also optionally be encrypted to prevent the desktop client 122 from accessing the private key. In this manner, the web client 112 and the desktop client 122 do not learn the contents of the private key. Rather, the desktop client 122 will only know the location of the private key. As noted above, the public key of the source user device 102 can be sent to the web client 112 for redistribution to one or more target user devices 104 that the source user device 102 is authorized to access. The web client 112 has SSH access in some embodiments to all devices in the user-to-target device mapping database 200, so the web client 112 will put the public key of the source user device 102 into the authorized keys file 132 of the target user devices 104 that the source user device 102 should have access to.

In one or more embodiments, after generating a key, the desktop client 122 will update the remote connection configuration file on the source user device 102 (e.g., the SSH configuration file) in an operating system appropriate way so that the desktop client 122 can use the newly generated private key as an Identity File. The configuration file, in some embodiments, has information about how to connect to certain devices. While it is possible to manually enter arguments for SSH without writing a configuration, the existence of a configuration file makes it easier for a user to connect. For example, the stored information may include the IP Address of the target user device 104, the user identifier on the target user device 104 and the location of the private key to be used as an identity file for the target user device 104.

The configuration file can also be updated in some embodiments to include IP addresses and user identifiers for whichever target user devices 104 that the source user should have access to. This last step can make the representative SSH process simpler, but is not necessarily required for the disclosed key management techniques to function, as the user identifier, IP address, and Identity File could be included as command line arguments to the SSH command in further variations, as would be apparent to a person of ordinary skill in the art.

Note that having a correctly configured SSH configuration file is insufficient by itself to grant access, in the same way that knowing where a door is, is not enough to unlock the door. However, the public key of the source user device 102 has been stored on the remote target user device 104 through the web client 112, which grants access to the source user. In this manner, the source user devices 102 are now configured and able to connect via SSH in some embodiments without the user interacting with public/private key pairs 124, configuration files or IP addresses.

When connecting via SSH, the desktop client 122 can verify that the SSH key fingerprint matches the stored value of the fingerprint in the database 200 of the web client 112.

FIG. 3 is a sample table of an exemplary authorized keys file 300, according to one or more embodiments. As noted above, the target user devices 104 further comprise the authorized keys file 300 for storing public keys of devices that are authorized to access the respective target user device 104. In some embodiments, a separate authorized keys file 300 is maintained for each target user device 104.

As shown in FIG. 3, the exemplary authorized keys file 300 comprises a user identifier for each entity that is authorized to access the respective target user device 104. In the example of FIG. 3, the exemplary authorized keys file 300 comprises a user identifier of one or more web clients (WC) and one or more source user devices (SU), such as source user devices $SU_1$ through $Su_k$, that were entered by the respective web client WC, such as web client $WC_1$. For each user identifier, the exemplary authorized keys file 300 also identifies the public key of the corresponding user.

FIG. 4 illustrates exemplary pseudo code for a web client process 400, according to one embodiment of the disclosure. As shown in FIG. 4, the exemplary web client process 400 comprises the following functionality that is performed by a given web client 112:

a source user logs on using a desktop client 122 of a source user device 102;

the web client process 400 executes a single sign-on service 108 to create a session for the desktop client 122;

the web client process 400 evaluates the user-to-target device mapping database 200 of FIG. 2 to identify one or more target user devices 104 to the desktop client 122 that the source user is authorized to access;

in response to a source user request to access a selected target user device 104, the exemplary web client process 400 performs the following steps:

receive the public key of the source user device 102 from the configuration file of the desktop client 122 for redistribution; and use the secure remote connection protocol to store the received public key of the source user device 102 in the authorized keys file 132 of the selected target user device 104.

The manner in which the source user device 102 accesses the selected target user device 104, after the public key of the source user device 102 has been stored by the web client 112 in the authorized keys file 132 of the selected target user device 104, is discussed further below in conjunction with FIG. 6.

In one variation of the web client process 400, rather than storing the public keys in the authorized keys file 132 of only the selected target user device 104, in response to the source user request to access the selected target user device 104, the web client 112 can pre-store the public key for a given source user in all authorized devices for which the given source user is authorized to access, as indicated in the user-to-target device mapping database 200.

FIG. 5 illustrates exemplary pseudo code for a desktop client process 500, according to one embodiment of the disclosure. As shown in FIG. 5, the exemplary desktop client process 500 comprises the following functionality that is performed by a given desktop client 122:

source user logs on to a web client 112 using the desktop client 122 of a given source user device 102 to create a single sign-on session for the desktop client 122;

the desktop client process 500 generates a public/private key pair for the given source user device 102;

the desktop client process 500 sends the public key of the source user device 102 to the web client 112 for redistribution to one or more target user devices 104; and the desktop client process 500 updates the remote configuration file of the given source user device 102 to use the generated private key as an identity file for a secure remote connection protocol (e.g., SSH) and to include the IP addresses and user identifiers for the target user devices 104 that the source user is authorized to access.

Generally, the identity file is a private key being used in public key authentication. The target user device 104 will be given the public key and can then verify that a desktop client 122 has the associated private key. The private key is sometimes called an identity file when it is used in this way.

Figure 6:
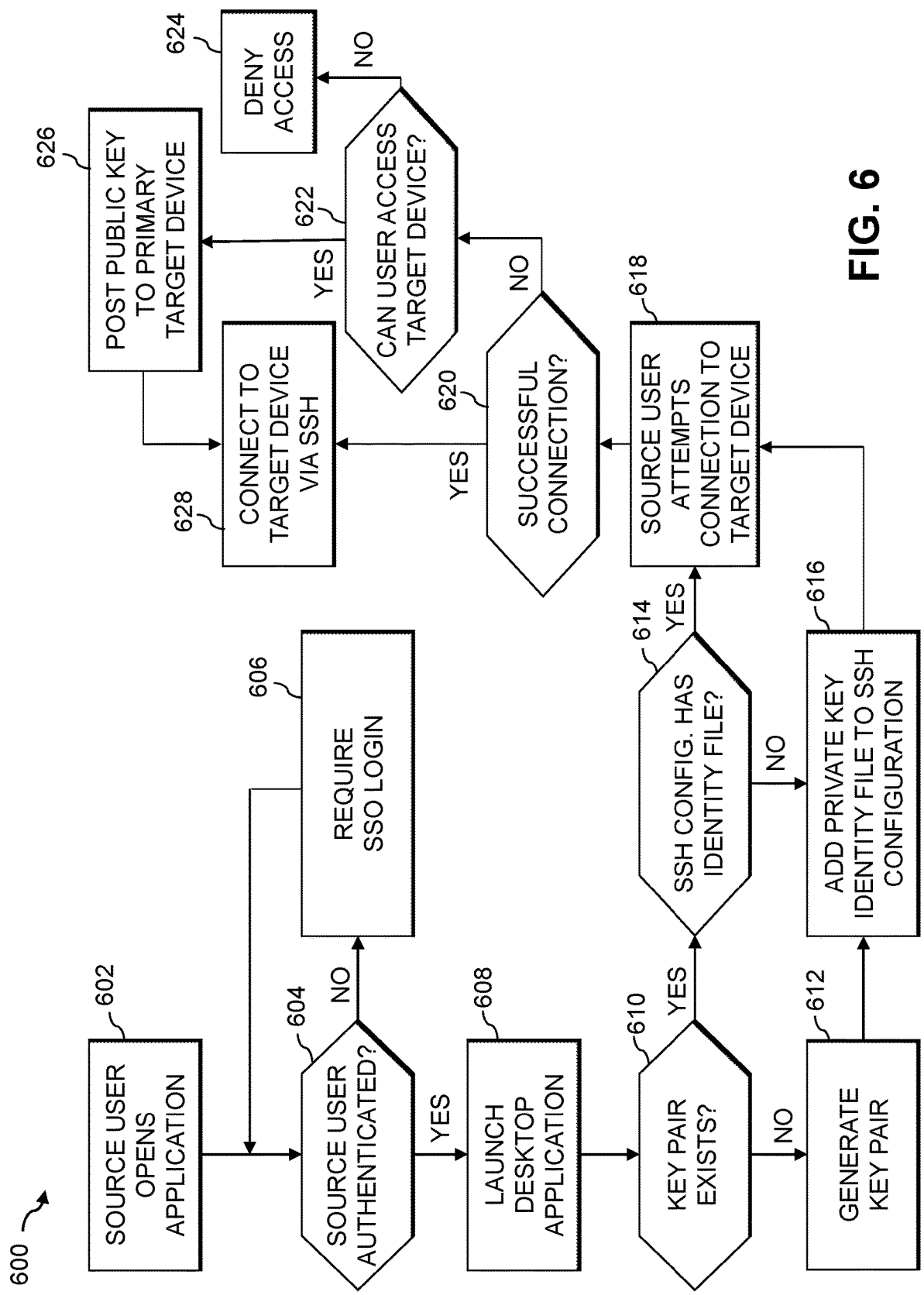
FIG. 6 is a flow chart illustrating an exemplary implementation of a key management process for accessing remote target devices using single sign-on techniques, according to an embodiment of the disclosure.

FIG. 6 is a flow chart illustrating an exemplary implementation of a key management process 600 for accessing remote target devices using single sign-on techniques, according to an embodiment of the disclosure. As shown in FIG. 6, the exemplary key management process 600 is initiated during step 602 when a source user opens an application to launch the key management process 600.

A test is performed during step 604 to determine if the source user is authenticated. If it is determined during step 604 that the source user is not authenticated, the key management process 600 requires an SSO login during step 606. If it is determined during step 604 that the source user is authenticated, the key management process 600 launches the desktop application (e.g., desktop client 122) during step 608.

A further test is performed during step 610 to determine if a key pair exists for the desktop client 122. If it is determined during step 610 that a key pair exists for the desktop client 122, yet another test is performed during step 614 to determine if the SSH configuration file of the source user device 102 includes the identity file. If it is determined during step 614 that the SSH configuration file of the source user device 102 includes the identity file, program control proceeds to step 618, discussed further below. If it is determined during step 614 that the SSH configuration file of the source user device 102 does not include the identity file, program control proceeds to step 616, discussed further below.

If it is determined during step 610 that a key pair does not exist for the desktop client 122, then a key pair is generated during step 612. During step 616, the exemplary key management process 600 adds the private key as an identity file to the SSH configuration file of the source user device 102.

During step 618, the source user attempts to connect the desired target user device 104. A test is performed during step 620 to determine if the connection attempt was successful. If it is determined during step 620 that the connection attempt was not successful, the exemplary key management process 600 performs another test during step 622 to determine if the source user is allowed to access the desired target user device 104. If it is determined during step 622 that the source user is not allowed to access the desired target user device 104, then access is denied during step 624.

If, however, it is determined during step 622 that the source user is allowed to access the desired target user device 104, then the public key of the source user device 102 is posted to the desired target user device 104 during step 626.

If it is determined during step 620 that the connection attempt was successful, or following execution of step 626, the exemplary key management process 600 connects the source user device 102 to the desired target user device 104 during step 628, for example, using the SSH protocol.

Figure 7:
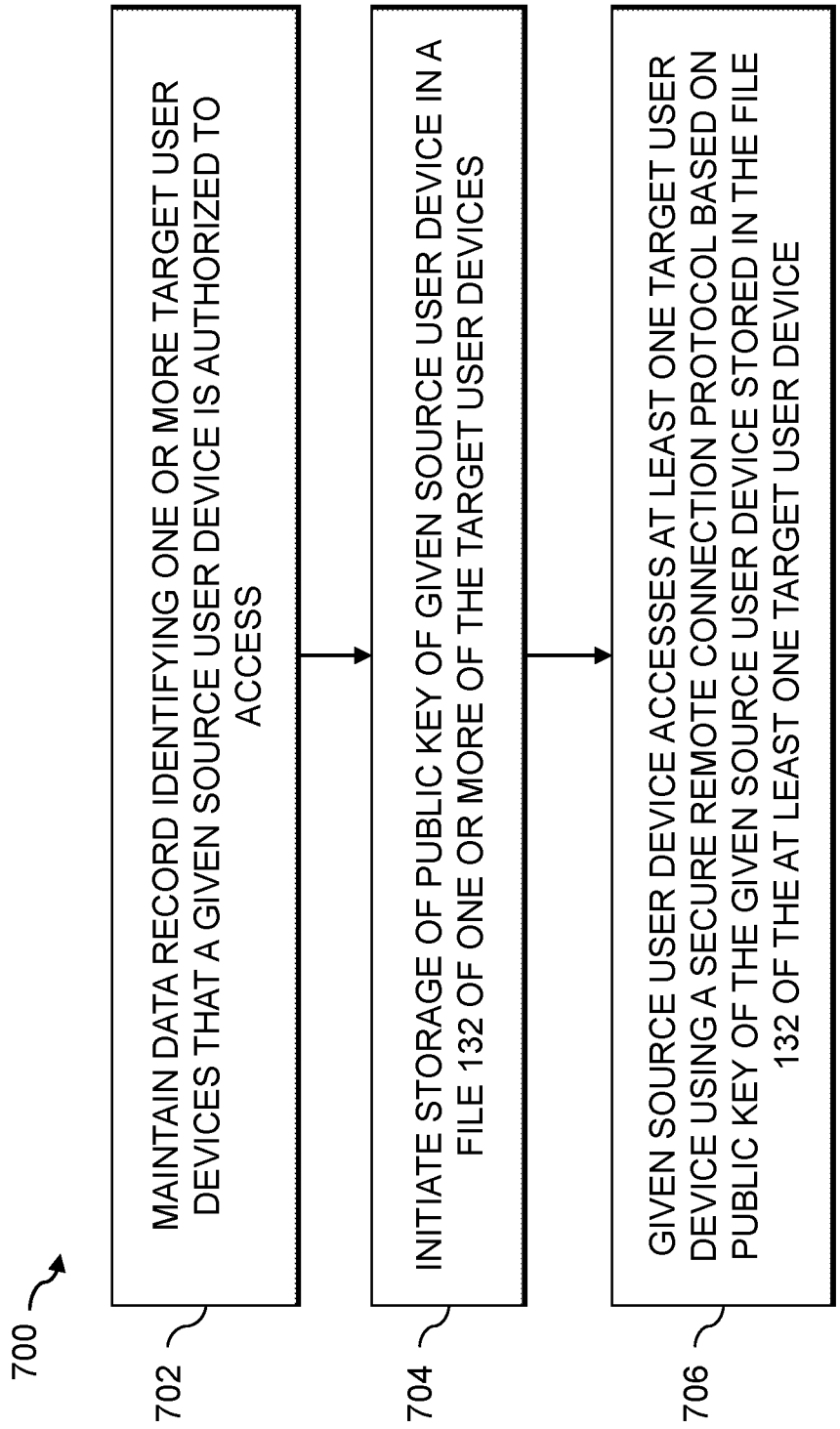
FIG. 7 is a flow chart illustrating an exemplary implementation of a key management process, according to at least one embodiment of the disclosure.

FIG. 7 is a flow chart illustrating an exemplary implementation of a key management process 700, according to at least one embodiment of the disclosure. In the example of FIG. 7, the exemplary key management process 700 maintains a data record during step 702 identifying one or more target user devices that a given source user device is authorized to access.

During step 704, the exemplary key management process 700 initiates storage of a public key of the given source user device in a file of one or more target user devices. Finally, during step 706, the given source user device accesses the at least one target user device using a secure remote connection protocol (e.g., SSH) based on the public key of the given source user device stored as a part of step 704 in the authorized keys file 132 of the at least one target user device.

In some embodiments, the initiating of the storage of the public key of the given source user device by the key management process 700 during step 704 is performed in response to a user of the given source user device requesting to access at least a given one of the one or more target user devices. In other embodiments, the initiating of the storage of the public key of the given source user device by the key management process 700 during step 704 is performed in response to one or more of the target user devices being identified in the data record.

The initiating of the storage of the public key of the given source user device by the key management process 700 during step 704 can be performed using the secure remote connection protocol.

In one or more embodiments, the key management process 700 may store a private key of the given source user device as an Identity File in a configuration file of the secure remote connection protocol on the given source user device. The configuration file of the secure remote connection protocol on the given source user device may further comprise a network address and a user identifier for the one or more target user devices that the given source user device is authorized to access.

The data record of step 702 may further comprise a fingerprint of at least one key of the at least one target user device, and the key management process 700 may compare a fingerprint of the at least one key returned by the at least one target user device upon the given source user device accessing the at least one target user device to the fingerprint of the at least one key of the at least one target user device obtained from the data record. The exemplary key management process 700 may authenticate the given source user device using a single sign-on service.

In addition, the exemplary key management process 700 may remove the authorization of the given source user device to access a given target user device by initiating a deletion of the public key of the given source user device in the data record for the given target user device and in the file of the given target user device.

The particular processing operations and other network functionality described in conjunction with the flow diagrams of FIGS. 6 and 7 are presented by way of illustrative example only, and should not be construed as limiting the scope of the disclosure in any way. Alternative embodiments can use other types of processing operations to manage keys for remote devices using a single sign-on. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In this manner, a given user can be removed by removing their access in the user-to-target device mapping database 200 and then clearing the public keys of the given user in the authorized keys file 132 on any target user device 104 where they had access. In at least some embodiments, an SSH connection to a given target user device 104 will fail because the authorized keys file 132 of the given target user device 104 no longer has the public key of the given user. In addition, since the public key of the given user is no longer in the user-to-target device mapping database 200, the web client 112 will not redistribute the public key. The web client 112 will re-grant access and copy the necessary public keys of all authorized users in some embodiments to the correct target user devices 104 (for example, redistributing the public keys of only authorized users, as the authorized users request access to certain target user devices 104).

In some embodiments, the public/private key pairs 124 of the source user devices 102 can be changed periodically (in a similar manner as changing passwords). The public/private key pairs 124 of the source user devices 102 can be changed automatically by the desktop client 122, in one or more embodiments, by deleting the local public/private key pair 124 so that the desktop client 122 regenerates a new public/private key pair 124.

In some embodiments, the disclosed automated key management techniques for remote devices using a single sign-on includes an ability to generate a public/private key pair on a number of operating systems and to pass a public key to a web client 112 for distribution to any number of target user devices 104.

In one or more embodiments, the configuration file for a secure remote connection protocol, such as an SSH configuration file, is updated using the disclosed key management techniques to point to a private key and connection details (e.g. usernames and IP addresses) for remote target user devices 104 that a respective source user should have access to. The use of a single sign-on ensures in at least some embodiments that only devices to which a given source user has been authorized access will have their information stored into this SSH configuration file.

Among other benefits, the disclosed key management techniques include the distribution of public keys to remote target user devices 104 matching a predetermined specification for a given source user. In other words, once the disclosed key management platform has authenticated a source user (e.g., using a SSO), the public key of the source user device 102 device that the source user is working on can be automatically distributed to any target user device 104 that the source user is authorized to access.

In this manner, the source user does not need outside help to distribute public keys, and the source user does not have to configure multiple source user devices 102. The disclosed automated key management techniques for access remote devices adds security to the key distribution process in some embodiments by requiring a single sign-on authentication.

In addition, the disclosed automated key management techniques for access remote devices improves security in some embodiments by storing the SSH key fingerprints in the user-to-target device mapping database 200 and using such fingerprints to verify the target user devices 104. When using SSH to connect to a remote target user device 104, the target user device 104 sends a fingerprint back to the source user so that the source user might verify the fingerprint. Once the source user has verified the fingerprint, the source user has the option to store the fingerprint in a file identifying known target user devices 104.

In general, the authorized keys file 132 can be purged automatically using the disclosed techniques with some regularity, since public keys of source users can be redistributed. In this automatic purging, the public key of the web client 112 remains in the authorized keys file 132. Keys can be cleared from the authorized keys file 132 on a time-driven basis or an event-driven basis (e.g., every day or every time there is a defined security event).

One or more embodiments of the disclosure provide improved methods, apparatus and computer program products for automated key management for accessing remote devices using single sign-on techniques. The foregoing applications and associated embodiments should be considered as illustrative only, and numerous other embodiments can be configured using the techniques disclosed herein, in a wide variety of different applications.

It should also be understood that the disclosed key management techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for accessing remote devices using single sign-on techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based key management engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based key management platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
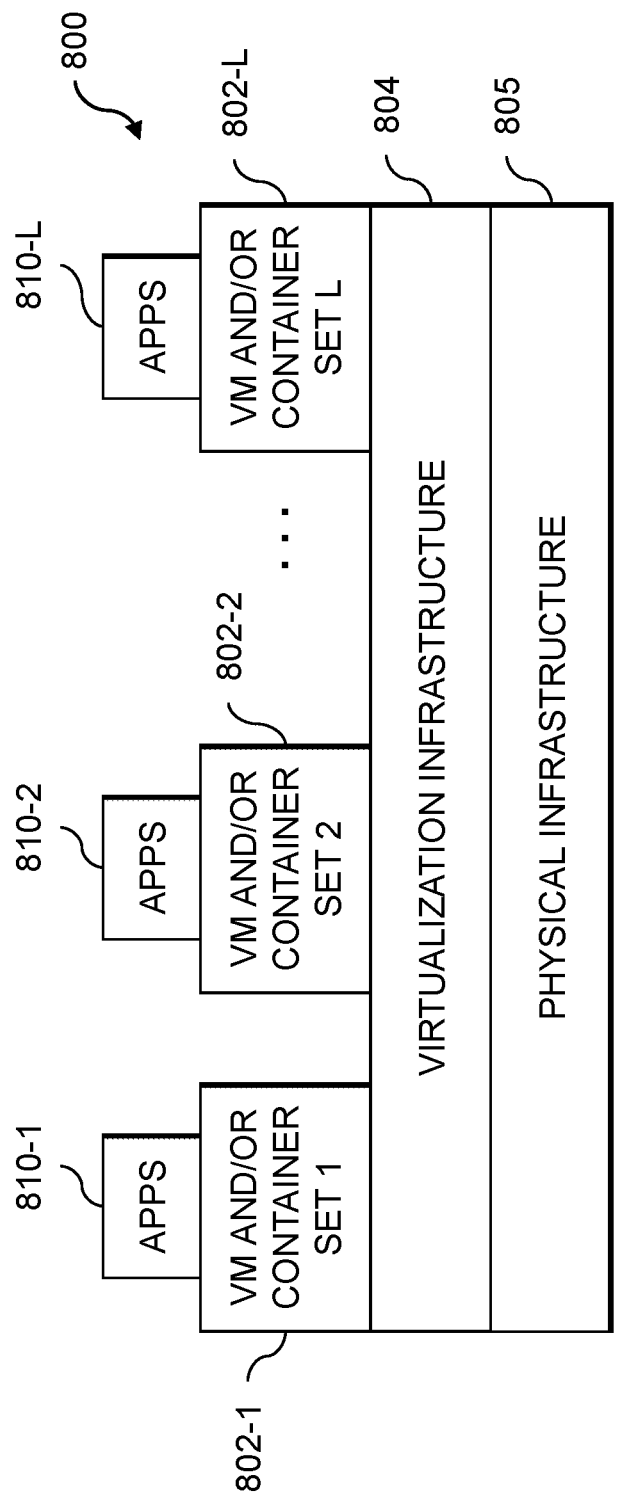
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide key management functionality of the type described above for one or more processes running on a given one of the VMs. For example, each of the VMs can implement key management control logic and associated user-to-target device mapping tables and authorized key files for providing key management functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide key management functionality of the type described above for one or more processes running on different ones of the containers. For example, a container host device supporting multiple containers of one or more container sets can implement one or more instances of key management control logic and associated user-to-target device mapping tables and authorized key files for providing key management functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
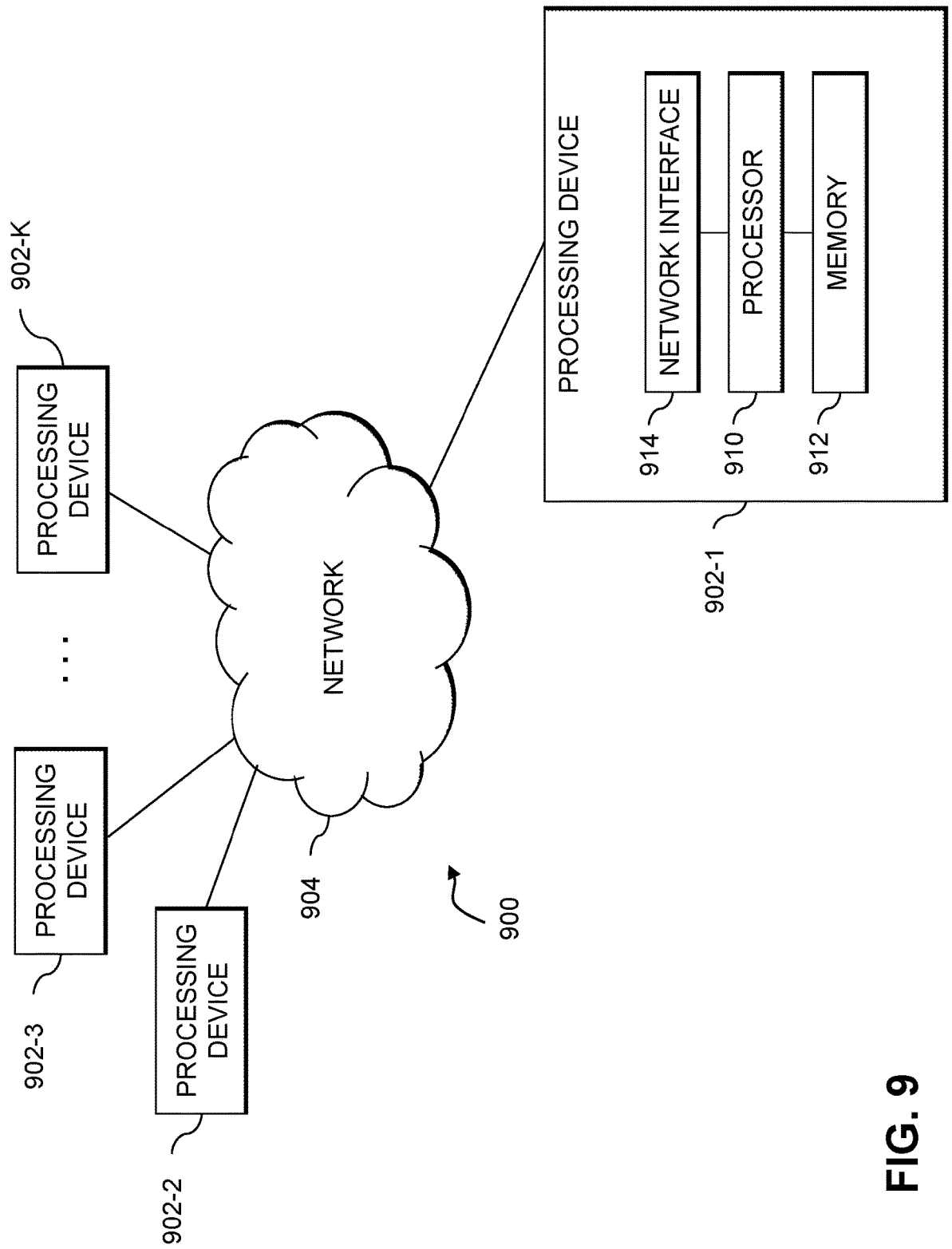
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
maintaining, by at least one server device, a data record identifying one or more target user devices that a given source user device is authorized to access, wherein the at least one server device is distinct from the one or more target user devices and the given source user device;
authenticating the given source user device using a single sign-on service; and
in response to one or more of: (i) a user of the given source user device requesting to access at least a given one of the one or more target user devices, and (ii) one or more of the target user devices being identified in the data record:
automatically distributing, by the at least one server device, a public key of the given source user device for storage in a file of at least one of the one or more target user devices, wherein the given source user device accesses the at least one target user device using a secure remote connection protocol based at least in part on the public key of the given source user device stored in the file of the at least one target user device;
wherein the method is performed by at least one processing device comprising a processor coupled to a memory.

2. The method of claim 1, wherein the initiating the storage of the public key of the given source user device is performed using the secure remote connection protocol.

3. The method of claim 1, wherein a private key of the given source user device is stored as an Identity File in a configuration file of the secure remote connection protocol on the given source user device.

4. The method of claim 3, wherein the configuration file of the secure remote connection protocol on the given source user device further comprises a network address and a user identifier for the one or more target user devices that the given source user device is authorized to access.

5. The method of claim 1, wherein the data record further comprises a fingerprint of at least one key of the at least one target user device, and further comprising comparing a fingerprint of the at least one key returned by the at least one target user device upon the given source user device accessing the at least one target user device to the fingerprint of the at least one key of the at least one target user device obtained from the data record.

6. The method of claim 1, further comprising removing the authorization of the given source user device to access a given target user device by initiating a deletion of the public key of the given source user device in the data record for the given target user device and in the file of the given target user device.

7. The method of claim 1, wherein the data record maps a user of the given source user device to the one or more target user devices.

8. An apparatus comprising:
at least one processing device comprising a processor coupled to a memory;
the at least one processing device being configured to implement the following steps:
maintaining, by at least one server device, a data record identifying one or more target user devices that a given source user device is authorized to access, wherein the at least one server device is distinct from the one or more target user devices and the given source user device; and
authenticating the given source user device using a single sign-on service; and
in response to one or more of: (i) a user of the given source user device requesting to access at least a given one of the one or more target user devices, and (ii) one or more of the target user devices being identified in the data record:
automatically distributing, by the at least one server device, a public key of the given source user device for storage in a file of at least one of the one or more target user devices, wherein the given source user device accesses the at least one target user device using a secure remote connection protocol based at least in part on the public key of the given source user device stored in the file of the at least one target user device.

9. The apparatus of claim 8, wherein a private key of the given source user device is stored as an Identity File in a configuration file of the secure remote connection protocol on the given source user device, wherein the configuration file of the secure remote connection protocol on the given source user device further comprises a network address and a user identifier for the one or more target user devices that the given source user device is authorized to access.

10. The apparatus of claim 8, wherein the data record further comprises a fingerprint of at least one key of the at least one target user device, and further comprising comparing a fingerprint of the at least one key returned by the at least one target user device upon the given source user device accessing the at least one target user device to the fingerprint of the at least one key of the at least one target user device obtained from the data record.

11. The apparatus of claim 8, further comprising removing the authorization of the given source user device to access a given target user device by initiating a deletion of the public key of the given source user device in the data record for the given target user device and in the file of the given target user device.

12. The apparatus of claim 8, wherein the data record maps a user of the given source user device to the one or more target user devices.

13. The apparatus of claim 8, wherein the storage of the public key of the given source user device is performed using the secure remote connection protocol.

14. A non-transitory processor-readable storage medium having stored therein program code of one or more software programs, wherein the program code when executed by at least one processing device causes the at least one processing device to perform the following steps:
maintaining, by at least one server device, a data record identifying one or more target user devices that a given source user device is authorized to access, wherein the at least one server device is distinct from the one or more target user devices and the given source user device; and
authenticating the given source user device using a single sign-on service; and
in response to one or more of: (i) a user of the given source user device requesting to access at least a given one of the one or more target user devices, and (ii) one or more of the target user devices being identified in the data record:
automatically distributing, by the at least one server device, a public key of the given source user device for storage in a file of at least one of the one or more target user devices, wherein the given source user device accesses the at least one target user device using a secure remote connection protocol based at least in part on the public key of the given source user device stored in the file of the at least one target user device.

15. The non-transitory processor-readable storage medium of claim 14, wherein a private key of the given source user device is stored as an Identity File in a configuration file of the secure remote connection protocol on the given source user device, wherein the configuration file of the secure remote connection protocol on the given source user device further comprises a network address and a user identifier for the one or more target user devices that the given source user device is authorized to access.

16. The non-transitory processor-readable storage medium of claim 14, wherein the data record further comprises a fingerprint of at least one key of the at least one target user device.

17. The non-transitory processor-readable storage medium of claim 14, further comprising removing the authorization of the given source user device to access a given target user device by initiating a deletion of the public key of the given source user device in the data record for the given target user device and in the file of the given target user device.

18. The non-transitory processor-readable storage medium of claim 14, wherein the data record maps a user of the given source user device to the one or more target user devices.

19. The non-transitory processor-readable storage medium of claim 14, wherein the storage of the public key of the given source user device is performed using the secure remote connection protocol.

20. The non-transitory processor-readable storage medium of claim 19, further comprising comparing a fingerprint of the at least one key returned by the at least one target user device upon the given source user device accessing the at least one target user device to the fingerprint of the at least one key of the at least one target user device obtained from the data record.

\* \* \* \* \*

UNITED STATES PATENT AND TRADEMARK OFFICE
CERTIFICATE OF CORRECTION

PATENT NO. : 11,489,824 B2
APPLICATION NO. : 16/886907
DATED : November 1, 2022
INVENTOR(S) : Robbins et al.

Page 1 of 1

It is certified that error appears in the above-identified patent and that said Letters Patent is hereby corrected as shown below:

In the Claims

Column 16, Line 15, in Claim 2, replace "The method of claim 1, wherein the initiating the" with -- The method of claim 1, wherein the --

Signed and Sealed this
Twenty-seventh Day of December, 2022

Katherine Kelly Vidal
*Director of the United States Patent and Trademark Office*